United States Patent
Sugimoto

(10) Patent No.: US 8,815,033 B2
(45) Date of Patent: *Aug. 26, 2014

(54) METHOD FOR PRODUCING PNEUMATIC TIRE AND PNEUMATIC TIRE

(75) Inventor: Mutsuki Sugimoto, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 129 days.

This patent is subject to a terminal disclaimer.

(21) Appl. No.: 13/161,622

(22) Filed: Jun. 16, 2011

(65) Prior Publication Data

US 2011/0315293 A1   Dec. 29, 2011

(30) Foreign Application Priority Data

Jun. 29, 2010 (JP) ................. 2010-147934
Jul. 23, 2010 (JP) ................. 2010-165958
Oct. 21, 2010 (JP) ................. 2010-236045

(51) Int. Cl.
  *B29D 30/06* (2006.01)
  *B32B 25/16* (2006.01)
  *B32B 25/08* (2006.01)
  *B60C 1/00* (2006.01)
  *B60C 5/14* (2006.01)

(52) U.S. Cl.
  CPC .......... B29D 30/0681 (2013.01); *B32B 2274/00* (2013.01); *B32B 25/16* (2013.01); *B32B 25/08* (2013.01); *B29D 2030/0682* (2013.01); *B60C 2005/145* (2013.01); *B60C 1/0008* (2013.01); *B60C 5/14* (2013.01); *B32B 2605/08* (2013.01)
  USPC .................. 156/123; 156/110.1; 156/130.5; 152/510

(58) Field of Classification Search
  USPC ............... 156/110.1, 130.5, 311, 498, 123; 152/510, 564, 565
  See application file for complete search history.

(56) References Cited

U.S. PATENT DOCUMENTS 4,542,466 A * 9/1985 Arimatsu ................ 700/199
4,910,321 A   3/1990 Kennedy et al.
(Continued)

FOREIGN PATENT DOCUMENTS

EP   2 172 349 A1   4/2010
FR   2 917 010 A1   12/2008
(Continued)

OTHER PUBLICATIONS

Machine-generated English language translation of 2003-71844 (orignal document dated 2005-071844).*

(Continued)

*Primary Examiner* — Martin Rogers
(74) *Attorney, Agent, or Firm* — Birch, Stewart, Kolasch & Birch, LLP

(57) ABSTRACT

A method for producing a pneumatic tire in which an air-in phenomenon between an inner liner and a carcass is avoided by preventing adhesion of the inner liner to a bladder includes the following steps. A green tire using, as an inner liner, a polymer laminate including a first layer having a thickness of 0.05 mm to 0.6 mm made of a styrene-isobutylene-styrene triblock copolymer, and a second layer composed of at least one of a second A layer made of a styrene-isoprene-styrene triblock copolymer and a second B layer made of a styrene-isobutylene diblock copolymer, the second layer having a thickness of 0.01 mm to 0.3 mm, is prepared. The green tire is mounted in a mold for vulcanization with pressurization by the bladder to obtain a vulcanized tire. The vulcanized tire is cooled at 50 to 120° C. for 10 to 300 seconds.

7 Claims, 2 Drawing Sheets

(56) References Cited

U.S. PATENT DOCUMENTS

| | | | |
|---|---|---|---|
| 4,946,899 A | 8/1990 | Kennedy et al. | |
| 5,219,948 A | 6/1993 | Storey et al. | |
| 5,428,111 A * | 6/1995 | Faust et al. | 525/314 |
| 5,548,029 A * | 8/1996 | Powers et al. | 525/195 |
| 6,462,131 B1 * | 10/2002 | Tse et al. | 525/70 |
| 2008/0249236 A1 | 10/2008 | Nakashima et al. | |
| 2009/0218024 A1 * | 9/2009 | Tsou et al. | 152/450 |
| 2010/0024941 A1 | 2/2010 | Hara et al. | |
| 2010/0051158 A1 | 3/2010 | Albert et al. | |
| 2010/0294411 A1 | 11/2010 | Custodero et al. | |
| 2011/0011511 A1 * | 1/2011 | Miyazaki et al. | 152/564 |
| 2011/0056604 A1 * | 3/2011 | Sugimoto | 152/510 |
| 2011/0180193 A1 | 7/2011 | Custodero et al. | |
| 2012/0003413 A1 * | 1/2012 | Lesage et al. | 428/36.6 |
| 2012/0048441 A1 | 3/2012 | Takahashi et al. | |

FOREIGN PATENT DOCUMENTS

| | | | | |
|---|---|---|---|---|
| FR | 2 939 076 A1 | 6/2010 | | |
| JP | 62-48704 A | 3/1987 | | |
| JP | 64-62308 A | 8/1989 | | |
| JP | 3-174403 A | 7/1991 | | |
| JP | 06-107896 | * 4/1994 | | C08L 53/00 |
| JP | 8-217922 A | 8/1996 | | |
| JP | 9-165469 A | 6/1997 | | |
| JP | 2003-71844 | * 3/2003 | | B29C 33/02 |
| JP | 2003-71844 A | 3/2003 | | |
| JP | 2009-149711 A | 7/2009 | | |
| JP | 2010-507510 A | 3/2010 | | |
| JP | 2012-510389 A | 5/2012 | | |
| WO | WO 2005/033035 A1 | 4/2005 | | |
| WO | 2006/132238 A1 | 12/2006 | | |
| WO | WO 2006/132238 A1 | 12/2006 | | |
| WO | WO 2007/050061 A1 | 5/2007 | | |
| WO | WO 2009/119232 | * 10/2009 | | C08L 53/00 |
| WO | WO 2009/156049 A1 | 12/2009 | | |
| WO | 2010/063427 A1 | 6/2010 | | |
| WO | WO 2010/063427 | * 6/2010 | | B32B 25/08 |
| WO | WO 2010/063427 A1 | 6/2010 | | |
| WO | 2010/119668 A1 | 10/2010 | | |
| WO | WO 2010/119668 A1 | 10/2010 | | |

OTHER PUBLICATIONS

Machine generated English language translation of JP 06-107896 (original document dated Jun. 1994).*

Search Report for European Application No. 11 00 2977 dated Oct. 19, 2011.

Japanese Office Action dated May 29, 2012, for Application No. 2010-236045 with the English translation.

* cited by examiner

METHOD FOR PRODUCING PNEUMATIC TIRE AND PNEUMATIC TIRE

This nonprovisional application is based on Japanese Patent Application No. 2010-147934 filed on Jun. 29, 2010, No. 2010-165958 filed on Jul. 23, 2010, and No. 2010-236045 filed on Oct. 21, 2010 with the Japan Patent Office, the entire contents of which are hereby incorporated by reference.

BACKGROUND OF THE INVENTION

1. Field of the Invention

The present invention relates to a method for producing a pneumatic tire, and more particularly to a method for producing a pneumatic tire with a polymer laminate used as an inner liner, and to a pneumatic tire produced by such production method.

2. Description of the Background Art

Recently, an attempt has been made to perform weight saving of tires because of strong social demands for fuel economy of automobiles. An attempt has also been made to perform weight saving of inner liners, among tire members, that are disposed at a tire radial inner side and have the function of improving air permeation resistance by decreasing the amount of air leaked to the outside from the inside of pneumatic tires (air permeation amount).

In a rubber composition for an inner liner, an improvement in air permeation resistance of tires is performed by using a butyl-based rubber containing 70 to 100% by mass of a butyl rubber and 30 to 0% by mass of a natural rubber. The butyl-based rubber contains, in addition to butylene, about 1% by mass of isoprene that enables co-crosslinking with an adjacent rubber along with sulfur, a vulcanization accelerator and zinc white. In the case of a conventional formulation, the butyl-based rubber requires a thickness of 0.6 to 1.0 mm for tires for passenger cars, or a thickness of about 1.0 to 2.0 mm for tires for trucks and buses.

In order to perform weight saving of tires, it has been proposed to use, as an inner liner, a thermoplastic elastomer that has excellent air permeation resistance as compared with the butyl-based rubber and can decrease the thickness of an inner liner layer. However, the thermoplastic elastomer that shows high air permeation resistance with a smaller thickness than that of the butyl-based rubber is inferior in vulcanization adhesive strength with an insulation or carcass rubber adjacent to the inner liner as compared with the butyl-based rubber. When the inner liner has low vulcanization adhesive strength, an air-in phenomenon occurs in which air permeates into the space between the inner liner and the insulation or the carcass, and thus a number of small air bubbles appear. This phenomenon raises a problem that a small spot pattern formed inside tires gives an impression of poor appearance to users. Further, air bubbles may cause the inner liner to peel off the insulation or carcass during driving, resulting in cracks in the inner liner to decrease a tire internal pressure. In the worst case, tires may burst.

Japanese Patent Laying-Open No. 09-165469 proposes a pneumatic tire capable of improving adhesion between an inner liner and a rubber composition that forms the inner surface of the tire or the carcass layer by forming an inner liner layer using nylon having low air permeability. However, in the technique of Japanese Patent Laying-Open No. 09-165469, there is a problem that a rubber cement composed of a rubber composition must be bonded to a nylon film having been subjected to an RFL treatment so as to form a nylon film layer, resulting in complicated steps. Furthermore, in the vulcanization step, there is usually employed a tire vulcanization method in which a bladder body is inserted into an unvulcanized tire (green tire) accommodated in a mold and the bladder body is expanded, and then vulcanization molding is performed by pressing the tire against the inner surface of the mold from the inside of the unvulcanized tire. In the inner liner layer of Japanese Patent Laying-Open No. 09-165469, the inner liner layer composed of the nylon film layer is brought into contact with the bladder in a heated state, and therefore the inner liner layer is adhered and bonded to the bladder. Thus, there arises a problem that, when the vulcanized tire is removed from the mold, the inner liner layer bonded to the bladder is taken away to the bladder side, resulting in the air-in phenomenon between the inner liner layer and the insulation or carcass.

SUMMARY OF THE INVENTION

An object of the present invention is to provide a method for producing a pneumatic tire with a thin polymer laminate having excellent air permeation resistance used as an inner liner in which an air-in phenomenon between the inner liner and an insulation or carcass is avoided by preventing adhesion of the inner liner to a bladder, and to provide a pneumatic tire produced by such production method.

The method for producing a pneumatic tire according to the present invention includes the following steps. A green tire using, as an inner liner, a polymer laminate including a first layer having a thickness of 0.05 mm to 0.6 mm containing a styrene-isobutylene-styrene triblock copolymer, and a second layer containing at least one of a second A layer containing a styrene-isoprene-styrene triblock copolymer and a second B layer containing a styrene-isobutylene diblock copolymer, the second layer having a thickness of 0.01 mm to 0.3 mm, is prepared. The green tire is mounted in a mold for vulcanization with pressurization by a bladder to obtain a vulcanized tire. The vulcanized tire is cooled at 50 to 120° C. for 10 to 300 seconds.

Preferably, in the method for producing a pneumatic tire in accordance with the present invention, the step of cooling the vulcanized tire is performed by cooling inside the bladder.

Preferably, in the method for producing a pneumatic tire in accordance with the present invention, the step of cooling the vulcanized tire uses, as a cooling medium, at least one selected from the group consisting of air, steam, water and oil.

In the method for producing a pneumatic tire in accordance with the present invention, the first layer of the polymer laminate is preferably disposed at an innermost side of the green tire in a radial direction.

In the method for producing a pneumatic tire in accordance with the present invention, the second layer of the polymer laminate is preferably disposed to contact a carcass layer of the green tire.

Preferably, in the method for producing a pneumatic tire in accordance with the present invention, the styrene-isobutylene-styrene triblock copolymer has a weight-average molecular weight of 50,000 to 400,000 and a styrene unit content of 10 to 30% by mass.

Preferably, in the method for producing a pneumatic tire in accordance with the present invention, the styrene-isoprene-styrene triblock copolymer has a weight-average molecular weight of 100,000 to 290,000 and a styrene unit content of 10 to 30% by mass.

Preferably, in the method for producing a pneumatic tire in accordance with the present invention, the styrene-isobutylene diblock copolymer is linear, and has a weight-average molecular weight of 40,000 to 120,000 and a styrene unit content of 10 to 35% by mass.

The present invention is a pneumatic tire produced by any one of the methods described above.

In accordance with the present invention, it is possible to provide a method for producing a pneumatic tire with a thin polymer laminate having excellent air permeation resistance used as an inner liner in which an air-in phenomenon between the inner liner and an insulation or carcass is avoided by preventing adhesion of the inner liner to a bladder, and to provide a pneumatic tire produced by such production method.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

<Pneumatic Tire>

Figure 1:
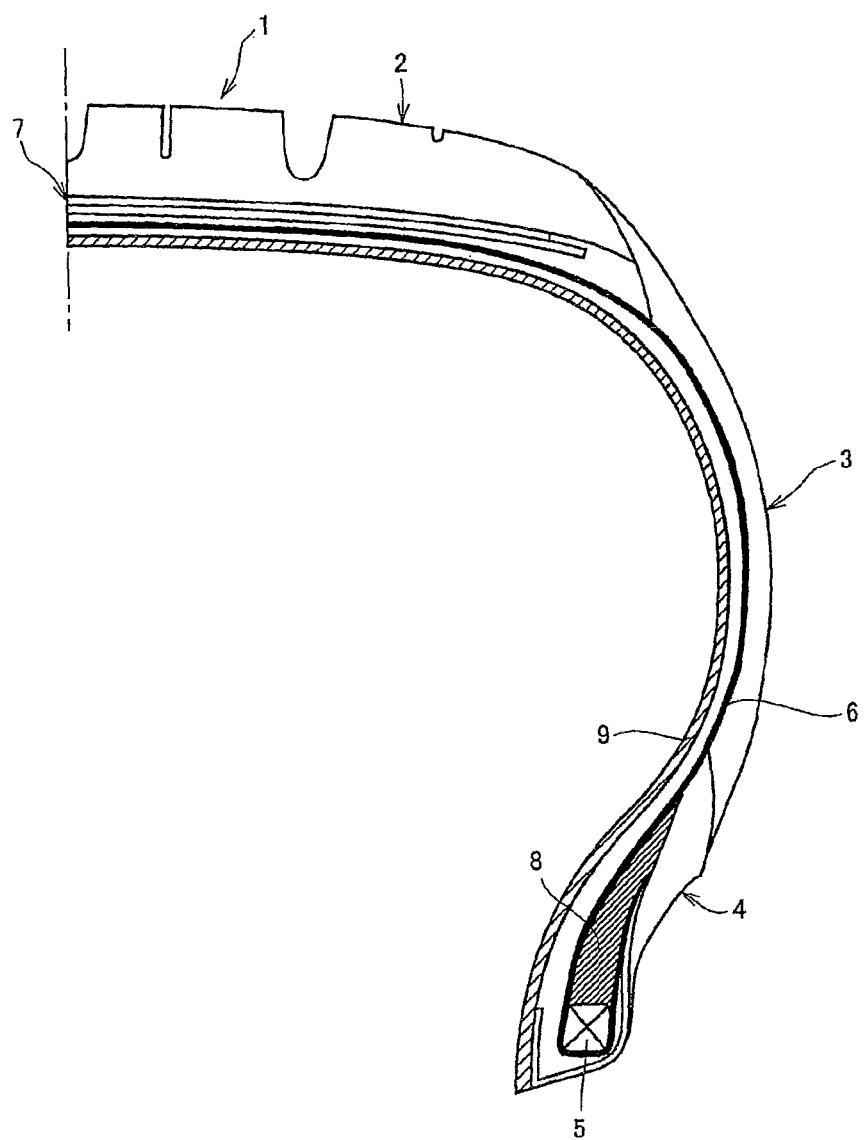
FIG. 1 is a schematic sectional view showing the right half of a pneumatic tire in accordance with one embodiment of the present invention.

A structure of a pneumatic tire produced by a method for producing a pneumatic tire according to one embodiment of the present invention will be described with reference to FIG. 1.

A pneumatic tire 1 can be used as tires for passenger cars, trucks and buses, and heavy-duty equipment. Pneumatic tire 1 includes a tread part 2, a sidewall part 3 and a bead part 4. Further, a bead core 5 is embedded in bead part 4. Also provided are a carcass 6 arranged to extend from one bead part 4 to the other bead part with each of opposite ends being folded back to latch bead core 5, and a belt layer 7 composed of two plies outside a crown part of carcass 6. An inner liner 9 extending from one bead part 4 to the other bead part 4 is disposed on the tire radial inner side of carcass 6. The two plies of belt layer 7, each being made of a steel cord or a cord of aramid fiber or the like, are arranged so that the cords intersect with each other and each form an angle of usually 5 to 30° with respect to a tire circumferential direction. Regarding the carcass, organic fiber cords made of polyester, nylon, aramid or the like are arranged at an angle of about 90° with respect to the tire circumferential direction, and a bead apex 8 extending from the top of bead core 5 toward the sidewall is disposed in a region surrounded by the carcass and the folded part thereof. It is to be noted that an insulation may be disposed between inner liner 9 and carcass 6.

In one embodiment of the present invention, inner liner 9 is made of a polymer laminate.

<Polymer Laminate>

In one embodiment of the present invention, a polymer laminate includes a first layer having a thickness of 0.05 mm to 0.6 mm made of a styrene-isobutylene-styrene triblock copolymer, and a second layer composed of at least one of a second A layer made of a styrene-isoprene-styrene triblock copolymer and a second B layer made of a styrene-isobutylene diblock copolymer, and the second layer has a thickness of 0.01 mm to 0.3 mm.

<First Layer>

In one embodiment of the present invention, the first layer is made of a styrene-isobutylene-styrene triblock copolymer (hereinafter also referred to as SIBS).

Because of an isobutylene block of an SIBS, a polymer film made of the SIBS has excellent air permeation resistance. Therefore, when a polymer film made of an SIBS is used as an inner liner, a pneumatic tire having excellent air permeation resistance can be obtained.

Furthermore, the SIBS has excellent durability since a molecular structure other than those of aromatic molecules is completely saturated and therefore deterioration and hardening are suppressed. Therefore, when a polymer film made of the SIBS is used as the inner liner, a pneumatic tire having excellent durability can be obtained.

When a pneumatic tire is produced by using a polymer film made of the SIBS as the inner liner, a halogenated rubber having high specific gravity, which has hitherto been used so as to impart air permeation resistance, such as a halogenated butyl rubber, is not used since air permeation resistance is ensured by the addition of the SIBS. Even if the halogenated rubber is used, the amount of use can be reduced. This enables weight saving of the tire and achieves the effect of improving fuel efficiency.

Although there is no particular limitation on the molecular weight of the SIBS, the weight-average molecular weight obtained by a GPC measurement is preferably from 50,000 to 400,000 in view of fluidity, the molding step and rubber elasticity. When the weight-average molecular weight is less than 50,000, tensile strength and tensile elongation may decrease. When the weight-average molecular weight is more than 400,000, extrusion moldability may deteriorate. Therefore, both the cases are not preferred.

The SIBS usually contains 10 to 40% by mass of a styrene unit. Since air permeation resistance and durability become more satisfactory, the content of the styrene unit in the SIBS is preferably from 10 to 30% by mass.

In the SIBS, a molar ratio of an isobutylene unit to a styrene unit (isobutylene unit/styrene unit) is preferably from 40/60 to 95/5 in view of the rubber elasticity of the copolymer. In the SIBS, the polymerization degree of each block is preferably from about 10,000 to 150,000 for an isobutylene block, and preferably from about 5,000 to 30,000 for a styrene block, in view of the rubber elasticity and handling (a polymer of a polymerization degree less than 10,000 is a liquid).

The SIBS can be obtained by a conventional polymerization method of a vinyl-based compound and, for example, can be obtained by a living cationic polymerization method.

Japanese Patent Laying-Open No. 62-048704 and Japanese Patent Laying-Open No. 64-062308 disclose that living cationic polymerization of isobutylene with other vinyl compounds can be performed and a polyisobutylene-based block copolymer can be produced by using isobutylene and other compounds as the vinyl compound. In addition, the method for production of a vinyl compound polymer by a living cationic polymerization method is described, for example, in U.S. Pat. No. 4,946,899, U.S. Pat. No. 5,219,948 and Japanese Patent Laying-Open No. 03-174403.

The SIBS does not have a double bond other than an aromatic double bond in the molecule and therefore has higher stability to ultraviolet rays than a polymer having a double bond in the molecule, such as polybutadiene, resulting in satisfactory weatherability.

The thickness of the first layer made of the SIBS is from 0.05 to 0.6 mm.

When the thickness of the first layer is less than 0.05 mm, the first layer may be broken by a pressing pressure during vulcanization of a green tire in which a polymer laminate is used as an inner liner, and thus an air leak phenomenon may occur in the resultant tire. In contrast, when the thickness of the first layer is more than 0.6 mm, tire weight increases and fuel efficiency deteriorates. The thickness of the first layer is more preferably from 0.05 to 0.4 mm.

The first layer can be obtained by forming the SIBS into a film by a conventional method of forming a thermoplastic resin or a thermoplastic elastomer into a film, such as extrusion molding or calender molding.

<Second Layer>

In one embodiment of the present invention, the second layer includes at least one of a second A layer made of a styrene-isoprene-styrene triblock copolymer (hereinafter also referred to as SIS) and a second B layer made of a styrene-isobutylene diblock copolymer (hereinafter also referred to as SIB).

<Second A Layer (SIS Layer)>

Since an isoprene block of a styrene-isoprene-styrene triblock copolymer is a soft segment, a polymer film made of the SIS is easily vulcanization-bonded with a rubber component. Therefore, when the polymer film made of the SIS is used as the inner liner, the inner liner is excellent in adhesion with an adjacent rubber constituting a carcass or an insulation, for example, and thus a pneumatic tire having excellent durability can be obtained.

Although there is no particular limitation on the molecular weight of the SIS, the weight-average molecular weight obtained by the GPC measurement is preferably from 100,000 to 290,000 in view of rubber elasticity and moldability. When the weight-average molecular weight is less than 100,000, tensile strength may decrease. When the weight-average molecular weight is more than 290,000, extrusion moldability may deteriorate. Therefore, both the cases are not preferred.

The content of a styrene unit in the SIS is preferably from 10 to 30% by mass in view of tackiness, adhesion and rubber elasticity.

In the SIS, a molar ratio of an isoprene unit to a styrene unit (isoprene unit/styrene unit) is preferably from 90/10 to 70/30. In the SIS, the polymerization degree of each block is preferably from about 500 to 5,000 for an isoprene block, and preferably from about 50 to 1,500 for a styrene block, in view of the rubber elasticity and handling.

The SIS can be obtained by a conventional polymerization method of a vinyl-based compound and, for example, can be obtained by a living cationic polymerization method.

The SIS layer can be obtained by forming the SIS into a film by a conventional method of forming a thermoplastic resin or a thermoplastic elastomer into a film, such as extrusion molding or calender molding.

<Second B Layer (SIB Layer)>

Since an isobutylene block of a styrene-isobutylene diblock copolymer is a soft segment, a polymer film made of the SIB is easily vulcanization-bonded with a rubber component. Therefore, when the polymer film made of the SIB is used as the inner liner, the inner liner is excellent in adhesion with an adjacent rubber constituting a carcass or an insulation, for example, and thus a pneumatic tire having excellent durability can be obtained.

It is preferred to use a linear one as the SIB in view of rubber elasticity and adhesion.

Although there is no particular limitation on the molecular weight of the SIB, the weight-average molecular weight obtained by the GPC measurement is preferably from 40,000 to 120,000 in view of rubber elasticity and moldability. When the weight-average molecular weight is less than 40,000, tensile strength may decrease. When the weight-average molecular weight is more than 120,000, extrusion moldability may deteriorate. Therefore, both the cases are not preferred.

The content of a styrene unit in the SIB is preferably from 10 to 35% by mass in view of tackiness, adhesion and rubber elasticity.

In the SIB, a molar ratio of an isobutylene unit to a styrene unit (isobutylene unit/styrene unit) is preferably from 90/10 to 65/35. In the SIB, the polymerization degree of each block is preferably from about 300 to 3,000 for an isobutylene block, and preferably from about 10 to 1,500 for a styrene block, in view of the rubber elasticity and handling.

The SIB can be obtained by a conventional polymerization method of a vinyl-based compound and, for example, can be obtained by a living cationic polymerization method.

International Publication No. WO 2005/033035 discloses a production method in which methylcyclohexane, n-butyl chloride and cumyl chloride are charged in a stirrer, cooled to −70° C. and reacted for 2 hours, and then the reaction is terminated by adding a large amount of methanol and the reaction product is vacuum-dried at 60° C. to obtain an SIB.

The SIB layer can be obtained by forming the SIB into a film by a conventional method of forming a thermoplastic resin or a thermoplastic elastomer into a film, such as extrusion molding or calender molding.

It is to be noted that the second layer can include another layer (hereinafter also referred to as a second C layer) in addition to the second A layer and the second B layer. It is preferred to use a polymer film made of urethane rubber or silicone rubber, for example, as the second C layer.

<Thickness of Second Layer>

The thickness of the second layer is from 0.01 mm to 0.3 mm. The thickness of the second layer as used herein means the thickness of the second A layer (SIS layer) when the second layer is composed only of the second A layer, the thickness of the second B layer (SIB layer) when the second layer is composed only of the second B layer, the total thickness of the second A layer (SIS layer) and the second B layer (SIB layer) when the second layer is composed of the second A layer and the second B layer, or the total thickness of the second A layer (SIS layer), the second B layer (SIB layer) and the second C layer when the second layer is composed of these layers. When the thickness of the second layer is less than 0.01 mm, the second layer may be broken by a pressing pressure during vulcanization of a green tire in which a polymer laminate is used as an inner liner, and thus the vulcanization adhesive force may decrease. In contrast, when the thickness of the second layer is more than 0.3 mm, tire weight increases and fuel efficiency deteriorates. The thickness of the second layer is more preferably from 0.05 to 0.2 mm.

<Structure of Polymer Laminate>

The structure of a polymer laminate will be described with reference to FIGS. 1 to 5.

(Embodiment 1)

Figure 2:
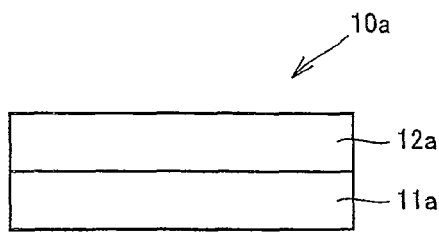
FIGS. 2 to 5 are schematic sectional views each showing a polymer laminate for use in one embodiment of the present invention.

As shown in FIG. 2, in one embodiment of the present invention, a polymer laminate 10a is composed of a first layer 11a and a second A layer 12a.

With reference to FIG. 1, when polymer laminate 10a is used as inner liner 9 of pneumatic tire 1, if a surface in which first layer 11a exists is arranged toward the tire radial innermost side, and a surface in which second A layer 12a exists is arranged toward a tire radial outer side so as to contact carcass 6, second A layer 12a and carcass 6 can be vulcanization-bonded in a vulcanization step of the tire. Therefore, the resultant pneumatic tire 1 can have excellent air permeation resistance and durability since inner liner 9 is satisfactorily bonded with a rubber layer of carcass 6.

(Embodiment 2)

Figure 3:
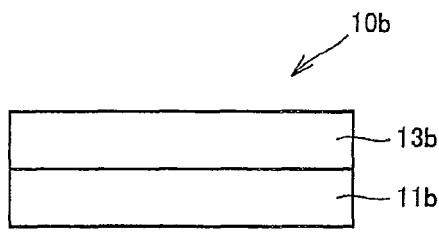

As shown in FIG. 3, in one embodiment of the present invention, a polymer laminate 10b is composed of a first layer 11b and a second B layer 13b.

With reference to FIG. 1, when polymer laminate 10b is used as inner liner 9 of pneumatic tire 1, if a surface in which first layer 11b exists is arranged toward the tire radial innermost side, and a surface in which second B layer 13b exists is arranged toward the tire radial outer side so as to contact carcass 6, second B layer 13b and carcass 6 can be vulcanization-bonded in the vulcanization step of the tire. Therefore, the resultant pneumatic tire 1 can have excellent air permeation resistance and durability since inner liner 9 is satisfactorily bonded with a rubber layer of carcass 6.

Embodiment 3)

Figure 4:
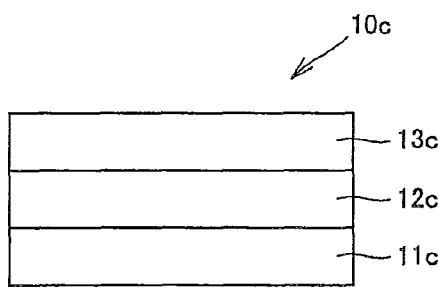

As shown in FIG. 4, in one embodiment of the present invention, a polymer laminate 10c is composed of a first layer 11c, a second A layer 12c and a second B layer 13c laminated in the order presented.

With reference to FIG. 1, when polymer laminate 10c is used as inner liner 9 of pneumatic tire 1, if a surface in which first layer 11c exists is arranged toward the tire radial innermost side, and a surface in which second B layer 13c exists is arranged toward the tire radial outer side so as to contact carcass 6, second B layer 13c and carcass 6 can be vulcanization-bonded in the vulcanization step of the tire. Therefore, the resultant pneumatic tire 1 can have excellent air permeation resistance and durability since inner liner 9 is satisfactorily bonded with a rubber layer of carcass 6.

(Embodiment 4)

Figure 5:
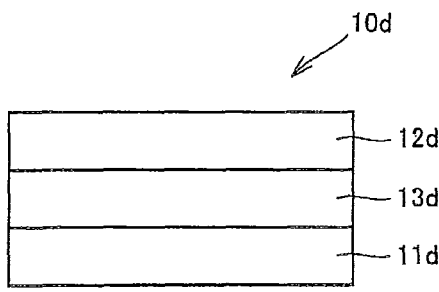

As shown in FIG. 5, in one embodiment of the present invention, a polymer laminate 10d is composed of a first layer 11d, a second B layer 13d and a second A layer 12d laminated in the order presented.

With reference to FIG. 1, when polymer laminate 10d is used as inner liner 9 of pneumatic tire 1, if a surface in which first layer 11d exists is arranged toward the tire radial innermost side, and a surface in which second A layer 12d exists is arranged toward the tire radial outer side so as to contact carcass 6, second A layer 12d and carcass 6 can be vulcanization-bonded in the vulcanization step of the tire. Therefore, the resultant pneumatic tire 1 can have excellent air permeation resistance and durability since inner liner 9 is satisfactorily bonded with a rubber layer of carcass 6.

(Embodiment 5)

In one embodiment of the present invention, a polymer laminate can include a second C layer in addition to the first layer, the second A layer and the second B layer. In this case, the second C layer is preferably arranged between the first layer and the second A layer, between the first layer and the second B layer, or between the second A layer and the second B layer.

<Method for Producing Polymer Laminate>

A polymer laminate can be obtained by lamination extrusion such as laminate extrusion or coextrusion of the SIBS, and at least one of the SIS and the SIB in the order described in, for example, any one of Embodiments 1 to 5.

<Method for Producing Pneumatic Tire>

In one embodiment of the present invention, a method for producing a pneumatic tire includes the following steps. A green tire with a polymer laminate used as an inner liner is prepared. The green tire is mounted in a mold for vulcanization with pressurization by a bladder to obtain a vulcanized tire. The vulcanized tire is cooled at 50 to 120° C. for 10 to 300 seconds.

<Step of Preparing Green Tire>

In one embodiment of the present invention, a polymer laminate is disposed on an inner liner part of a green tire. When the polymer laminate is disposed on the green tire, the second A layer or the second B layer constituting the second layer of the polymer laminate is arranged toward the tire radial outer side so as to contact carcass 6. With such an arrangement, the second A layer or the second B layer and carcass 6 can be vulcanization-bonded in a tire vulcanization step. Therefore, the resultant pneumatic tire 1 can have excellent air permeation resistance and durability since inner liner 9 is satisfactorily bonded with the rubber layer of carcass 6.

Also when an insulation is provided between inner liner 9 and carcass 6, it is possible to increase the adhesive strength between inner liner 9 and the insulation by arranging the second A layer or the second B layer constituting the second layer of the polymer laminate toward the tire radial outer side so as to contact the insulation.

<Step of Obtaining Vulcanized Tire>

Next, the resultant green tire is mounted in a mold and vulcanized while being pressurized by a bladder.

The mold is made of a metal. The bladder is made of a rubber. The bladder is held in the mold.

In the step of obtaining a vulcanized tire, the green tire is placed in an opened mold. During the placement, the bladder is shrunk. Upon the placement, the bladder is located at the inner side of the green tire. The bladder is filled with a gas to expand. The green tire is deformed by this expansion. This deformation is called shaping. Next, the mold is tightened and an internal pressure of the bladder is increased. The green tire is interposed between a cavity surface of the mold and the outside surface of the bladder to be pressurized. The green tire is heated by heat conduction from the mold and the bladder. The rubber composition of the green tire flows due to application of pressure and heat. Air inside the mold is moved by the flow to be discharged from the mold. The rubber is heated to cause the vulcanization reaction, and thus a vulcanized tire is obtained.

Vulcanization is preferably performed at 150 to 180° C. for 3 to 50 minutes, for example.

<Step of Cooling Vulcanized Tire>

Next, the resultant vulcanized tire is cooled at 50 to 120° C. for 10 to 300 seconds.

In one embodiment of the present invention, an inner liner is implemented by a polymer laminate including the first layer made of an SIBS and the second layer composed of at least one of the second A layer made of an SIS and the second B layer made of an SIB. The SIBS, the SIS and the SIB constituting the polymer laminate, which are thermoplastic elastomers, are softened in the mold when heated to 150 to 180° C., for example, in the step of obtaining the vulcanized tire. The softened thermoplastic elastomers have higher reactivity than in the solid state, and are thus fused with an adjacent member. That is, the inner liner in contact with the outside surface of the expanded bladder is softened by heating to be fused with the bladder. When an attempt is made to remove the vulcanized tire from the mold in a state where the inner liner is fused with the outside surface of the bladder, the inner liner peels off the insulation or the carcass adjacent thereto, causing an air-in phenomenon. Further, the tire may be deformed in shape.

In one embodiment of the present invention, the resultant vulcanized tire is immediately quenched at 120° C. or lower for 10 or more seconds without opening the mold so that the bladder is maintained at a high internal pressure. The thermoplastic elastomer used for the inner liner can thereby be solidified. When the thermoplastic elastomer is solidified, fusing of the inner liner with the bladder is eliminated, and thus the releasability when removing the vulcanized tire from the mold is improved.

The cooling temperature is from 50 to 120° C. When the cooling temperature is lower than 50° C., it is necessary to prepare a particular cooling medium, which may degrade productivity. When the cooling temperature is higher than 120° C., the thermoplastic elastomer may not be sufficiently cooled, which causes the inner liner to be still fused with the bladder upon opening of the mold, giving rise to an air-in phenomenon. In view of solidifying the thermoplastic elastomer at its softening point or below, the cooling temperature is preferably from 70 to 100° C.

The cooling time is from 10 to 300 seconds. When the cooling time is less than 10 seconds, the thermoplastic elastomer may not be sufficiently cooled, which causes the inner liner to be still fused with the bladder upon opening of the mold, giving rise to an air-in phenomenon. When the cooling time is more than 300 seconds, productivity is degraded. In view of an compatibility between softening of the thermoplastic elastomer and productivity, the cooling time is preferably from 30 to 180 seconds.

The step of cooling the vulcanized tire is preferably performed by cooling inside the bladder. Since a cavity exists inside the bladder, it is possible to introduce a cooling medium controlled to the cooling temperature into the bladder after completion of the vulcanization step.

It is also possible to carry out the step of cooling the vulcanized tire by cooling inside the bladder and also disposing a cooling structure in the mold.

It is preferred to use, as a cooling medium, at least one selected from the group consisting of air, steam, water and oil. Of these, water having excellent cooling efficiency is preferably used.

EXAMPLES

The present invention will now be described specifically based on examples, but the present invention is not limited only thereto.

Examples 1 to 24, Comparative Examples 1 to 7

(Preparation of SIB)

In a 2 L reaction vessel equipped with a stirrer, 589 mL of methylcyclohexane (dried over molecular sieves), 613 mL of n-butyl chloride (dried over molecular sieves) and 0.550 g of cumyl chloride were charged. After cooling the reaction vessel to −70° C., 0.35 mL of α-picoline(2-methylpyridine) and 179 mL of isobutylene were added. Further, 9.4 mL of titanium tetrachloride was added to start polymerization, and then the solution was reacted for 2.0 hours while being stirred at −70° C. Next, 59 mL of styrene was added into the reaction vessel and the reaction was continued for 60 minutes, and then the reaction was terminated by adding a large amount of methanol. After removing the solvent and the like from the reaction solution, a polymer was dissolved in toluene and washed twice with water. This toluene solution was added to the methanol mixture, thereby precipitating a polymer, and the resultant polymer was dried at 60° C. for 24 hours to obtain a styrene-isobutylene diblock copolymer. The resultant styrene-isobutylene diblock copolymer has a weight-average molecular weight of 70,000 and a styrene unit content of 15% by mass.

(Production of Polymer Laminate)

As the SIBS, SIB STAR 102T (weight-average molecular weight of 100,000, styrene unit content of 25% by mass, Shore A hardness of 25) manufactured by Kaneka Corporation was prepared.

As the SIS, D1161JP (weight-average molecular weight of 150,000, styrene unit content of 15% by mass) manufactured by Kraton Polymers LLC was prepared.

The SIB was implemented by the styrene-isobutylene diblock copolymer (weight-average molecular weight of 70,000, styrene unit content of 15% by mass) prepared as described above in (Preparation of SIB).

The respective pellets of the SIBS, the SIS and the SIB were coextruded to obtain polymer laminates of Examples 1 to 24 and Comparative Examples 1 to 7 having thicknesses shown in Tables 2 to 4. In the polymer laminates of Examples 17 to 20 and Comparative Example 6, the second A layer (SIS layer) and the second B layer (SIB layer) are laminated on the first layer (SIBS layer) in the order presented. In the polymer laminates of Examples 21 to 24 and Comparative Example 7, the second B layer (SIB layer) and the second A layer (SIS layer) are laminated on the first layer (SIBS layer) in the order presented.

In Comparative Example 1, 90 parts by mass of chlorobutyl ("Exxon chlorobutyl 1068" manufactured by Exxon Mobil Corporation), 10 parts by mass of a natural rubber (NR, TSR20) and 50 parts by mass of a filler ("SEAST V" (N660, nitrogen-adsorption specific surface area: 27 $m^2$/g) manufactured by Tokai Carbon Co., Ltd.) were mixed by a Banbury mixer and then formed into a sheet by a calender roll to obtain a polymer film having a thickness of 1.0 mm (indicated as IIR/NR/filler layer in Table 2).

(Production of Pneumatic Tire)

The resultant polymer laminate or polymer film was used as the inner liner portion of a tire to prepare a green tire. It is to be noted that, in Examples 1 to 24 and Comparative Examples 4 to 7, the polymer laminate was arranged so that the first layer was located at the tire radial innermost side and the second layer contacted the carcass. The green tire was subjected to press molding in a mold at 170° C. for 20 minutes to obtain a vulcanized tire of 195/65R15 size. Then, the vulcanized tire was cooled by introducing water controlled to the cooling temperatures shown in Tables 2 to 4 into a bladder. After a lapse of the cooling times shown in Tables 2 to 4, the vulcanized tire was removed from the mold to obtain a pneumatic tire.

With respect to the resultant pneumatic tire, the following evaluations were performed.

(Tire Productivity)

Tire productivity refers to production efficiency based on the number of produced tires per hour, and was evaluated on the following criteria.

A: a level equivalent to typical productivity

B: inferior to typical productivity, but with a production efficiency drop within 5%

C: inferior to typical productivity, and with a production efficiency drop exceeding 5%

(Presence or Absence of Air-in Portions)

The inside of the tire after the vulcanization step and the cooling step was examined, and evaluated on the following criteria.

A: In appearance, per tire, the number of air-in portions with a diameter of 5 mm or less and the number of air-in portions with a diameter more than 5 mm were both 0.

B: In appearance, per tire, the number of air-in portions with a diameter of 5 mm or less was one to three, and the number of air-in portions with a diameter more than 5 mm was 0.

C: In appearance, per tire, the number of air-in portions with a diameter of 5 mm or less was four or more, and the number of air-in portions with a diameter more than 5 mm was one or more.

(Flex Crack Growth)

In a driving test of tire durability, it was evaluated whether the inner liner was broken or peeled off. The produced pneumatic tire of 195/65R15 size was mounted on a YES standard rim 15×6JJ, and the inside of the tire was monitored under the conditions of a tire internal pressure of 150 KPa, which is lower than usual, a load of 600 kg, a speed of 100 km/hour, and a driving distance of 20,000 km, to measure the number of cracked/peeled portions. The resultant value was expressed as an index by the following equation for flex crack growth in Examples 1 to 24 and Comparative Examples 2 to 7 using Comparative Example 1 as a reference (100). It shows that the greater the value, more excellent the flex crack growth resistance.

(flex crack growth index)=(the number of cracked/peeled portions of Comparative Example 1)/(the number of cracked/peeled portions of each of Examples 1 to 24 and Comparative Examples 2 to 7)×100

(Rolling Resistance)

Using a rolling resistance tester manufactured by KOBE STEEL, LTD., the produced pneumatic tire of 195/65R15 size was mounted on a JIS standard rim 15×6JJ, and rolling resistance was measured while driving the tire at room temperatures (38° C.) under the conditions of a load of 3.4 kN, an air pressure of 230 kPa, and a speed of 80 km/hour. The resultant value was expressed as an index by the following equation for rolling resistance in Examples 1 to 24 and Comparative Examples 2 to 7 using Comparative Example 1 as a reference (100). It shows that the greater the value, the smaller the rolling resistance, which is preferable.

(rolling resistance index)=(rolling resistance of Comparative Example 1)/(rolling resistance of each of Examples 1 to 24 and Comparative Examples 2 to 7)×100

(Static Air Pressure Drop)

The produced tire of 195/65R15 size was mounted on a JIS standard rim 15×6JJ and an initial air pressure of 300 kPa was applied. The tire was left at room temperatures for 90 days, following which an air pressure drop rate was calculated.

(Overall Judgment)

Criteria for overall judgment are as shown in Table 1.

TABLE 1

| Overall judgment | Judgment criteria | (a) Tire productivity | (b) Presence or absence of air-in portions | (c) Flex crack growth index | (d) Rolling resistance Index | (e) Static air pressure drop rate (%/month) |
|---|---|---|---|---|---|---|
| A | All of (a) to (e) satisfy conditions on the right. | A | A | 100 < (c) | 100 < (d) | (e) ≤ 2.5 |
| B | Any one of (a) to (e) satisfies a corresponding condition on the right. A lower evaluation is adopted in the case of corresponding to plural judgments. | B | B | 80 < (c) ≤ 100 | 80 < (d) ≤ 100 | 2.5 < (e) ≤ 4.0 |
| C | Any one of (a) to (e) satisfies a corresponding condition on the right. A lower evaluation is adopted in the case of corresponding to plural judgments. | C | C | (c) ≤ 80 | (d) ≤ 80 | 4.0 < (e) |

(Evaluation Results)

The test results are shown in Tables 2 to 4.

TABLE 2

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Polymer laminate composition | IIR/NR/filler layer (mm) | — | — | — | — | — | — | — | — | — | — | — |
| | First layer (SIBS layer) (mm) | 0.59 | 0.59 | 0.30 | 0.30 | 0.59 | 0.59 | 0.30 | 0.30 | 0.50 | 0.50 | 0.05 |
| | Second A layer (SIS layer) (mm) | 0.01 | 0.01 | 0.30 | 0.30 | — | — | — | — | 0.01 | 0.01 | 0.01 |
| | Second B layer (SIB layer) (mm) | — | — | — | — | 0.01 | 0.01 | 0.30 | 0.30 | — | — | — |
| Cooling step | Cooling temperature (° C.) | 50 | 120 | 50 | 120 | 50 | 120 | 50 | 120 | 50 | 120 | 50 |
| | Cooling time (sec) | 10 | 300 | 10 | 300 | 10 | 300 | 10 | 300 | 10 | 300 | 10 |
| Evaluation | Tire productivity | A | A | A | A | A | A | A | A | A | A | A |
| | Tire test — Presence or absence of air-in portions | A | A | A | A | A | A | A | A | A | A | A |
| | Flex crack growth index | 135 | 149 | 143 | 158 | 131 | 145 | 139 | 154 | 138 | 153 | 201 |
| | Rolling resistance index | 105 | 105 | 107 | 107 | 104 | 104 | 106 | 106 | 106 | 106 | 110 |
| | Static air pressure drop rate (%) | 1.8 | 1.9 | 2.3 | 2.4 | 1.8 | 1.9 | 2.3 | 2.4 | 1.9 | 2.0 | 2.4 |
| | Overall judgment | A | A | A | A | A | A | A | A | A | A | A |

TABLE 2-continued

|  |  |  | Examples ||||| Comparative Examples |||||
|---|---|---|---|---|---|---|---|---|---|---|---|---|
|  |  |  | 12 | 13 | 14 | 15 | 16 | 1 | 2 | 3 | 4 | 5 |
| Polymer laminate composition | | IIR/NR/filler layer (mm) | — | — | — | — | — | 1.00 | — | — | — | — |
| | | First layer (SIBS layer) (mm) | 0.05 | 0.5 | 0.5 | 0.05 | 0.05 | — | 0.60 | 0.60 | 0.04 | 0.59 |
| | | Second A layer (SIS layer) (mm) | 0.01 | — | — | — | — | — | — | — | 0.05 | 0.01 |
| | | Second B layer (SIB layer) (mm) | — | 0.01 | 0.01 | 0.01 | 0.01 | — | — | — | — | — |
| Cooling step | | Cooling temperature (° C.) | 120 | 50 | 120 | 50 | 120 | None | None | 40 | 120 | 130 |
| | | Cooling time (sec) | 300 | 10 | 300 | 10 | 300 | None | None | 9 | 300 | 350 |
| Evaluation | | Tire productivity | A | A | A | A | A | A | C | B | B | C |
| | Tire test | Presence or absence of air-in portions | A | A | A | A | A | A | C | — | B | B |
| | | Flex crack growth index | 223 | 132 | 147 | 197 | 216 | 100 | 50 | — | 82 | 80 |
| | | Rolling resistance index | 110 | 106 | 106 | 109 | 109 | 100 | 98 | — | 97 | 96 |
| | | Static air pressure drop rate (%) | 2.5 | 1.9 | 2.0 | 2.5 | 1.9 | 4.0 | 2.7 | — | 4.0 | 3.9 |
| | Overall judgment | | A | A | A | A | A | B | C | C | C | C |

TABLE 3

|  |  | Examples |||| Comparative Example |
|---|---|---|---|---|---|---|
|  |  | 17 | 18 | 19 | 20 | 6 |
| Polymer laminate composition | First layer (SIBS layer) (mm) | 0.50 | 0.50 | 0.10 | 0.10 | 0.50 |
| | Second A layer (SIS layer) (mm) | 0.10 | 0.10 | 0.01 | 0.01 | 0.10 |
| | Second B layer (SIB layer) (mm) | 0.10 | 0.10 | 0.01 | 0.01 | 0.10 |
| Cooling step | Cooling temperature (° C.) | 50 | 120 | 50 | 120 | 130 |
| | Cooling time (sec) | 10 | 300 | 10 | 300 | 350 |
| Evaluation | Tire productivity | A | A | A | A | C |
| | Tire test | Presence or absence of air-in portions | A | A | A | A | B |
| | Flex crack growth index | 123 | 130 | 186 | 194 | 79 |
| | Rolling resistance index | 105 | 105 | 109 | 109 | 97 |
| | Static air pressure drop rate (%) | 1.8 | 1.8 | 2.3 | 2.3 | 4.0 |
| | Overall judgment | A | A | A | A | C |

TABLE 4

|  |  | Examples |||| Comparative Example |
|---|---|---|---|---|---|---|
|  |  | 21 | 22 | 23 | 24 | 7 |
| Polymer laminate composition | First layer (SIBS layer) (mm) | 0.50 | 0.50 | 0.10 | 0.10 | 0.5 |
| | Second A layer (SIS layer) (mm) | 0.10 | 0.10 | 0.01 | 0.01 | 0.10 |
| | Second B layer (SIB layer) (mm) | 0.10 | 0.10 | 0.01 | 0.01 | 0.10 |
| Cooling step | Cooling temperature (° C.) | 50 | 120 | 50 | 120 | 130 |
| | Cooling time (sec) | 10 | 300 | 10 | 300 | 350 |
| Evaluation | Tire productivity | A | A | A | A | C |
| | Tire test | Presence or absence of air-in portions | A | A | A | A | B |
| | Flex crack growth index | 123 | 130 | 186 | 194 | 79 |
| | Rolling resistance index | 105 | 105 | 109 | 109 | 97 |
| | Static air pressure drop rate (%) | 1.8 | 1.8 | 2.3 | 2.3 | 4.0 |
| | Overall judgment | A | A | A | A | C |

Examples 1 to 4 and 9 to 12 are pneumatic tires with a polymer laminate composed of the first layer and the second A layer (SIS layer) used as an inner liner. The first layer has a thickness of 0.05 to 0.59 mm, and the second layer has a thickness of 0.01 to 0.30 mm. The method for producing the tire includes the step of cooling the vulcanized tire at 50 to 120° C. for 10 to 300 seconds. The method for producing the tire was equivalent in tire productivity to a conventional production method. The resultant pneumatic tire was superior to Comparative Example 1 of a conventional example in presence or absence of air-in portions, flex crack growth resistance, rolling resistance, and static air pressure drop rate.

Examples 5 to 8 and 13 to 16 are pneumatic tires with a polymer laminate composed of the first layer and the second B layer (SIB layer) used as an inner liner. The first layer has a thickness of 0.05 to 0.59 mm, and the second layer has a thickness of 0.01 to 0.30 mm. The method for producing the tire includes the step of cooling the vulcanized tire at 50 to 120° C. for 10 to 300 seconds. The method for producing the tire was equivalent in tire productivity to a conventional production method. The resultant pneumatic tire was superior to Comparative Example 1 of a conventional example in presence or absence of air-in portions, flex crack growth resistance, rolling resistance, and static air pressure drop rate.

Comparative Example 2 is a pneumatic tire with a 0.6-mm-thick polymer film composed only of the first layer used as an inner liner. Since the production method of Comparative Example 2 did not include the step of cooling the vulcanized tire, the pneumatic tire was removed from the mold with the polymer film fused on the bladder, resulting in an air-in phenomenon. Due to the air-in phenomenon, the flex crack growth resistance was significantly degraded.

Comparative Example 3 is a pneumatic tire with a 0.6-mm-thick polymer film composed only of the first layer used as an inner liner. The method for producing the tire was scheduled to perform the step of cooling the vulcanized tire at 40° C. for 9 seconds, however, cooling under such conditions was physically impossible, so that a pneumatic tire could not be produced.

Comparative Example 4 is a pneumatic tire with a polymer laminate composed of the first layer and the second A layer (SIS layer) used as an inner liner. The first layer has a thickness of 0.04 mm, and the second layer has a thickness of 0.05 mm. The method for producing the tire includes the step of cooling the vulcanized tire at 120° C. for 300 seconds. The method for producing the tire consumed time for handling and molding since the first layer was too thin, resulting in inferior tire productivity to a conventional production method. The resultant pneumatic tire was inferior to Comparative Example 1 of a conventional example in presence or absence of air-in portions, flex crack growth resistance, rolling resistance, and static air pressure drop rate. This is considered because the first layer was too thin, which resulted in insufficient strength.

Comparative Example 5 is a pneumatic tire with a polymer laminate composed of the first layer and the second A layer (SIS layer) used as an inner liner. The first layer has a thickness of 0.59 mm, and the second layer has a thickness of 0.01 mm. The method for producing the tire includes the step of cooling the vulcanized tire at 130° C. for 350 seconds. The method for producing the tire required long time for the cooling step, resulting in inferior tire productivity to a conventional production method. The resultant pneumatic tire was inferior to Comparative Example 1 of a conventional example and Examples 1 and 2 having the same polymer laminate composition in presence or absence of air-in portions, flex crack growth index, and rolling resistance index.

Examples 17 to 20 are pneumatic tires with a polymer laminate composed of the first layer, the second A layer and the second B layer, that are laminated in the order presented, used as an inner liner. The first layer has a thickness of 0.10 to 0.50 mm, the second A layer has a thickness of 0.01 to 0.1 mm, and the second B layer has a thickness of 0.01 to 0.1 mm. The total thickness of the second A layer and the second B layer is from 0.02 to 0.2 mm. The method for producing the tire includes the step of cooling the vulcanized tire at 50 to 120° C. for 10 to 300 seconds. The method for producing the tire was equivalent in tire productivity to a conventional production method. The obtained pneumatic tire was superior to Comparative Example 1 of a conventional example in presence or absence of air-in portions, flex crack growth resistance, rolling resistance, and static air pressure drop rate.

Comparative Example 6 is a pneumatic tire with a polymer laminate composed of the first layer, the second A layer and the second B layer, laminated in the order presented, used as an inner liner. The first layer has a thickness of 0.50 mm, the second A layer has a thickness of 0.1 mm, and the second B layer has a thickness of 0.1 mm. The total thickness of the second A layer and the second B layer is 0.2 mm. The method for producing the tire includes the step of cooling the vulcanized tire at 130° C. for 350 seconds. The method for producing the tire was inferior in tire productivity to a conventional production method. The resultant pneumatic tire was inferior to Comparative Example 1 of a conventional example and Examples 17 and 18 having the same polymer laminate composition in presence or absence of air-in portions, flex crack growth resistance, rolling resistance, and static air pressure drop rate.

Examples 21 to 24 are pneumatic tires with a polymer laminate composed of the first layer, the second B layer and the second A layer, laminated in the order presented, used as an inner liner. The first layer has a thickness of 0.10 to 0.50 mm, the second B layer has a thickness of 0.01 to 0.1 mm, and the second A layer has a thickness of 0.01 to 0.1 mm. The total thickness of the second A layer and the second B layer is from 0.02 to 0.2 mm. The method for producing the tire includes the step of cooling the vulcanized tire at 50 to 120° C. for 10 to 300 seconds. The method for producing the tire was equivalent in tire productivity to a conventional production method. The resultant pneumatic tire was superior to Comparative Example 1 of a conventional example in presence or absence of air-in portions, flex crack growth resistance, rolling resistance, and static air pressure drop rate.

Comparative Example 7 is a pneumatic tire with a polymer laminate composed of the first layer, the second B layer and the second A layer, laminated in the order presented, used as an inner liner. The first layer has a thickness of 0.50 mm, the second B layer has a thickness of 0.1 mm, and the second A layer has a thickness of 0.1 mm. The total thickness of the second A layer and the second B layer is 0.2 mm. The method for producing the tire includes the step of cooling the vulcanized tire at 130° C. for 350 seconds. The method for producing the tire was inferior in tire productivity to a conventional production method. The resultant pneumatic tire was inferior to Comparative Example 1 of a conventional example and Examples 21 and 22 having the same polymer laminate composition in presence or absence of air-in portions, flex crack growth resistance, rolling resistance, and static air pressure drop rate.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method for producing a pneumatic tire, comprising the steps of:
   preparing a green tire using, as an inner liner, a polymer laminate including a first layer having a thickness of 0.05 mm to 0.6 mm, wherein said first layer is consisting essentially of a styrene-isobutylene-styrene triblock copolymer, and a second layer consisting essentially of a styrene-isobutylene diblock copolymer with a fully saturated isobutylene block, said second layer having a thickness of 0.01 mm to 0.3 mm;
   mounting said green tire in a mold for vulcanization with pressurization by a bladder to obtain a vulcanized tire; and
   cooling said vulcanized tire at 50 to 120° C. for 10 to 300 seconds.

2. The method for producing a pneumatic tire in accordance with claim 1, wherein the step of cooling said vulcanized tire is performed by cooling inside the bladder.

3. The method for producing a pneumatic tire in accordance with claim 1, wherein the step of cooling said vulcanized tire uses, as a cooling medium, at least one selected from the group consisting of air, steam, water and oil.

4. The method for producing a pneumatic tire in accordance with claim 1, wherein said first layer of said polymer laminate is disposed at an innermost side of said green tire in a radial direction.

5. The method for producing a pneumatic tire in accordance with claim 1, wherein said second layer of said polymer laminate is disposed to contact a carcass layer of said green tire.

6. The method for producing a pneumatic tire in accordance with claim 1, wherein said styrene-isobutylene-styrene triblock copolymer has a weight-average molecular weight of 50,000 to 400,000 and a styrene unit content of 10 to 30% by mass.

7. The method for producing a pneumatic tire in accordance with claim 1, wherein said styrene-isobutylene diblock copolymer is linear and has a weight-average molecular weight of 40,000 to 120,000 and a styrene unit content of 10 to 35% by mass.

* * * * *